March 10, 1970  G. O. WILSON  3,499,200
METHOD OF MAKING A BEARING RETAINER
Filed Feb. 13, 1967
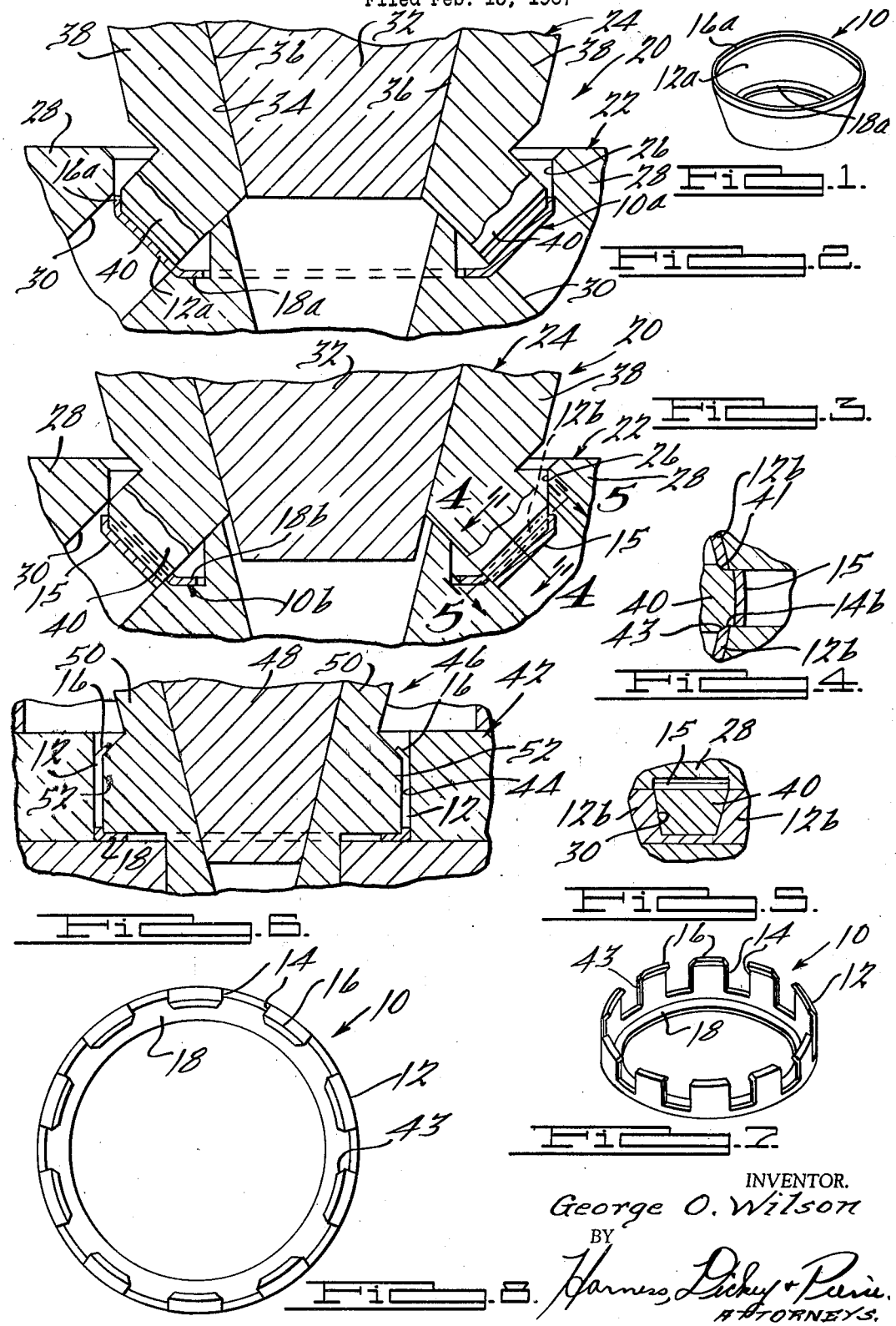
INVENTOR.
George O. Wilson
BY
Harness, Dickey & Pierce.
ATTORNEYS.

United States Patent Office 3,499,200
Patented Mar. 10, 1970

3,499,200
METHOD OF MAKING A BEARING RETAINER
George O. Wilson, Grosse Pointe Shores, Mich., assignor to Federal-Mogul Corporation, Inc., Southfield, Mich., a corporation of Michigan
Filed Feb. 13, 1967, Ser. No. 615,459
Int. Cl. B21d 51/12; B21h 1/14; B21k 1/04
U.S. Cl. 29—148.4
8 Claims

ABSTRACT OF THE DISCLOSURE

A method for making from a generally conically shaped cup a bearing retainer having a plurality of retaining fingers.

---

The present invention relates to a method for making roller bearing roller retainers, and more specifically a method for making retainers which are of the finger type construction.

It is a general object of the present invention to provide a novel method for the manufacture of roller bearing roller retainers.

It is another object of the present invention to provide a novel method for making roller bearing roller retainers which are of the finger type construction.

Other objects, features, and advantages of the present invention will become apparent from the subsequent description and the appended claims, taken in conjunction with the accompanying drawings, in which:

FIGURE 1 is a perspective view, to reduced scale, of a roller retainer blank;

FIGURE 2 is a fragmentary sectional view showing the initiation of the first step upon the blank of FIGURE 1 in which the fingers are formed;

FIGURE 3 is a view similar to FIGURE 2 showing the completion of the first step;

FIGURE 4 is a sectional view of the apparatus of FIGURE 3 taken generally along the line 4—4;

FIGURE 5 is a sectional view of the apparatus of FIGURE 3 generally taken along the line 5—5;

FIGURE 6 is a fragmentary sectional view depicting a second step in which the fingers of the formed retainer blank are straightened;

FIGURE 7 is a perspective view, to reduced scale, of the finally formed retainer resulting from the method of the present invention; and FIGURE 8 is a top elevational view of the retainer of FIGURE 7.

In the various steps shown in the drawings, apparatus similar to that shown in the U.S. Patent to J. R. Squire, No. 2,774,132 issued Dec. 18, 1956 has been utilized.

FIGURE 7 shows the finger type retainer 10 which is to be made by the method of the present invention. The retainer 10 includes a plurality of axially extending fingers 12 which define openings or pockets 14 for receiving roller members (not shown) in a bearing assembly. The fingers 12 terminate in an outer tab portion 16 which are bent generally radially inwardly so as to grip the ends of the roller members. The retainer 10 is assembled in a bearing by snapping the fingers over roller members which are assembled onto and circumferentially spaced about a bearing race. The tab portion 16 is bent to provide a slight interference with the roller members as the retainer 10 is moved onto the roller members; the fingers 12 are sufficiently flexible and bend such that the retainer 10 can be moved over the associated roller members substantially without permanent deformation. Once the roller members have been located within the pockets 14, the fingers 12, because of their resilience, move to their original positions with the interference created by the tab 16 holding the retainer 10 to the roller members. The retainer 10 has an inner annular ring portion 18 which adds to the rigidity of the retainer 10.

In the description of the various steps, the various portions of the retainer as it is formed are given numerical designations the same as those used with the retainer 10 in FIGURE 7, with the addition of letter subscripts $a$ and $b$.

In FIGURE 1, a generally frusto-conically shaped cup 10a is utilized as an initial blank and can be formed from flat sheet stock. The cup 10a has an annular portion 18a and a frusto conically extending finger forming portion 12a. The finger forming portion 12a terminates in a radially inwardly extending tab forming portion 16a. In the first step, the blank 10a is located in a machine or die assembly 20 which includes a cavity member 22 and a punch assembly 24. The cavity member 22 has an annular cavity 26 which is of a shape to generally matingly receive the blank 10a. The cavity member 22 is partially defined by a side wall 28 which is provided with a plurality of circumferentially spaced openings 30. The openings 30 are utilized in the blanking out of the openings or pockets 14 and hence forming the fingers 16 (see FIGURE 7). The punch assembly 24 includes a center expansion member 32 which has a generally frusto-conically shaped side surface 34 which is in engagement with similarly shaped inside surfaces 36 of a plurality of movable punch members 38. The punch members 38 are movable radially inwardly and outwardly in response to axial inner and outer movement of the expanding member 32. Thus as the expanding member 32 is moved downwardly, the punch members 38 will be moved radially outwardly and as the member 32 is moved upwardly the members 38 will be moved inwardly. The punch members 38 have punch portions 40 which are located in line with openings 30 in the cavity member 22. With the blank 10a located in the cavity 26, as the expanding member 22 is moved axially downwardly, the punch members 38 are moved radially outwardly into the openings 30 with the punch portions 40 removing the metal 15 in line with the openings 30. The punch operation as shown in FIGURE 3, results in a punched blank 10b. The punched blank 10b, by the removal of metal 15, results in the formation of a plurality of fingers 12b and pockets 14b.

Note that in FIGURE 4 the corners 41 of the punch portions 40 are tapered and swage the inner edges 43 of the fingers 12b which edges 43 define the surfaces which engage the roller members; by swaging the edges 43 the sharp corners are removed and a better bearing surface for engagement with the roller members is provided.

The pockets 14 and hence the fingers 12 have generally parallelly extending sides. Since the legs 12b are formed from a frusto-conical shape (12a) and are to be bent radially inwardly to form the retainer 10 to result in parallel edges 43, it is necessary that the punched out metal portions 15 be generally of a trapezoidal shape, as shown in FIGURE 5. Hence the punch portion 40 and the aperture 30 are generally of a trapezoidal shape (see FIGURE 5).

In the next step, shown in FIGURE 6, the leg portions 12b are moved radially inwardly. A die assembly 46, similar to assembly 20 in FIGURES 2 and 3, can be utilized. A cavity member 42 has an annular cavity 44 having a generally axially extending or straight side wall. An expanding assembly 46 has an expanding member 48 and expandable members 50. The members 48 and 50 are similar to the members 32 and 38 except that the expandable members 50 are provided with mating portions 52 which are locatable within the interior of the punched blank 10b rather than punch portions 40. With the mating portions 52 located in the blank 10b, the entire expanding assembly 46 is moved downwardly into the cavity 44 resulting in the legs 14b being moved radially inwardly to axially extending positions (see FIGURE 6) thereby resulting in the retainer 10 as shown in FIGURES 7 and 8. Retraction of the assembly 46 will remove with it the retainer 10; further retraction of the expanding member 48 will result in radially inward movement of the expandable members 50 and the release of the retainer 10.

Note that in other methods of forming a finger type retainer similar to retainer 10, the fingers are formed by blanking initially from flat stock. By performing the blanking operation at this stage, a greater amount of scrap material results as compared to the forming of the fingers from the frusto-conically shaped cup 10a.

While it will be apparent that the preferred embodiment of the invention disclosed is well calculated to fulfill the objects above stated, it will be appreciated that the invention is susceptible to modification, variations and change without departing from the proper scope or fair meaning of the subjoined claims.

What is claimed is:

1. The method of forming a finger type retainer for use with a plurality of roller members and having a plurality of circumferentially disposed generally axially extending fingers comprising the steps of: forming a cup shaped blank having a frusto-conically shaped side wall, removing the material from a plurality of circumferentially spaced locations to define a plurality of circumferentially spaced fingers, and deforming the cup prior to assembly of the roller members to move the plurality of fingers radially inwardly from the original position of the side wall to define pockets having generally straight side walls.

2. The method of claim 1 in which the material removed is generally of a trapezoidal shape.

3. The method of claim 2 in which the fingers are formed with substantially parallel edge surfaces.

4. The method of claim 1 in which the edge surfaces of the fingers are swaged to provide for a wider contact surface.

5. The method of claim 1 in which the side wall of the cup shaped blank terminates in a lip inclining radially inwardly from the side wall with the lip defining radially inwardly extending tabs on the fingers as finally formed.

6. The method of claim 5 in which the edge surfaces of the fingers are swaged to provide for a wider contact surface.

7. The method of claim 6 in which the fingers are formed with substantially parallel edge surfaces.

8. The method of claim 7 in which the material removed is generally of a trapezoidal shape.

References Cited

UNITED STATES PATENTS

| | | | |
|---|---|---|---|
| 1,613,058 | 1/1927 | Sauer et al. | 308—201 |
| 1,645,866 | 10/1927 | Lothrop | 113—117 |
| 1,824,787 | 9/1931 | Nolan | 308—218 |

THOMAS H. EAGER, Primary Examiner

U.S. Cl. X.R.

113—117; 308—218